US007373381B2

(12) United States Patent
Rust

(10) Patent No.: US 7,373,381 B2
(45) Date of Patent: *May 13, 2008

(54) SYSTEM AND METHOD FOR APPLICATION VIEWING THROUGH COLLABORATIVE WEB BROWSING SESSION

(75) Inventor: David Bradley Rust, San Diego, CA (US)

(73) Assignee: InterCall, Inc., Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/747,753

(22) Filed: May 11, 2007

(65) Prior Publication Data

US 2007/0208808 A1    Sep. 6, 2007

Related U.S. Application Data

(63) Continuation of application No. 10/688,485, filed on Oct. 16, 2003, now Pat. No. 7,228,332, and a continuation of application No. 09/442,517, filed on Nov. 18, 1999, now Pat. No. 6,668,273.

(51) Int. Cl.
*G06F 15/16* (2006.01)
(52) U.S. Cl. .................. 709/205; 709/217; 709/219
(58) Field of Classification Search ........ 709/200–205, 709/217–220
See application file for complete search history.

(56) References Cited

U.S. PATENT DOCUMENTS

| 5,293,619 A | 3/1994 | Dean |
| 5,440,699 A | 8/1995 | Farrand et al. |
| 5,530,795 A | 6/1996 | Wan |
| 5,583,993 A | 12/1996 | Foster et al. |

(Continued)

FOREIGN PATENT DOCUMENTS

DE    19717167 A1    10/1998

(Continued)

OTHER PUBLICATIONS

Abdel-Wahab, H. et al., "Universal Internet Conference Information System," Computer Scinence 1996.

(Continued)

*Primary Examiner*—Moustafa Meky

(57) ABSTRACT

A collaborative Web browsing session may take place over a network, allowing the Presenter on a first computer to direct the audio and visual components of a browser on one or more second computers. The Attendee on the second computer logs into a control site computer located on the Web and subsequently relinquishes Web browser control to the Presenter on the first computer. The collaborative Web browsing session ("session"), as created by the Presenter and witnessed by the Attendee, is comprised of a predetermined set of Web pages and slides. The present invention allows the Presenter of a collaborative Web browsing session to dynamically integrate a region of the Presenter's display into the session. The Presenter configures the first computer to select a region on its display for integration into the session. Additionally, the Presenter configures keyboard combinations to execute the capture of the selected region. Upon capture, an image associated with the region is sent to the control site computer as part of the session. The control site computer incorporates the dynamically included image into the session and transmits the image to the second computer where the image is displayed for viewing by the Attendee.

1 Claim, 8 Drawing Sheets

U.S. PATENT DOCUMENTS

| | | | |
|---|---|---|---|
| 5,608,426 A | 3/1997 | Hester | |
| 5,608,872 A | 3/1997 | Schwartz et al. | |
| 5,623,603 A | 4/1997 | Jiang et al. | |
| 5,634,018 A | 5/1997 | Tanikoshi et al. | |
| 5,649,104 A | 7/1997 | Carleton et al. | |
| 5,706,502 A | 1/1998 | Foley et al. | |
| 5,742,670 A | 4/1998 | Bennett | |
| 5,745,711 A | 4/1998 | Kitahara et al. | |
| 5,748,898 A | 5/1998 | Ueda | |
| 5,754,830 A | 5/1998 | Butts et al. | |
| 5,761,419 A | 6/1998 | Schwartz et al. | |
| 5,764,901 A | 6/1998 | Skarbo et al. | |
| 5,778,368 A | 7/1998 | Hogan et al. | |
| 5,781,727 A | 7/1998 | Carleton et al. | |
| 5,781,909 A | 7/1998 | Logan et al. | |
| 5,786,814 A | 7/1998 | Moran et al. | |
| 5,809,247 A | 9/1998 | Richardson et al. | |
| 5,819,243 A | 10/1998 | Rich et al. | |
| 5,844,979 A | 12/1998 | Raniere et al. | |
| 5,859,974 A | 1/1999 | McArdle et al. | |
| 5,894,556 A | 4/1999 | Grimm et al. | |
| 5,907,324 A | 5/1999 | Larson et al. | |
| 5,916,302 A | 6/1999 | Dunn et al. | |
| 5,930,238 A | 7/1999 | Nguyen | |
| 5,930,743 A | 7/1999 | Warren | |
| 5,933,417 A | 8/1999 | Rottoo | |
| 5,940,082 A | 8/1999 | Brinegar et al. | |
| 5,944,791 A | 8/1999 | Scherpbier | |
| 5,951,652 A | 9/1999 | Ingrassia, Jr. et al. | |
| 5,953,506 A | 9/1999 | Kalra et al. | |
| 5,978,835 A | 11/1999 | Ludwig et al. | |
| 5,991,276 A | 11/1999 | Yamamoto | |
| 5,991,796 A | 11/1999 | Anupam et al. | |
| 5,995,606 A | 11/1999 | Civanlar et al. | |
| 5,995,951 A | 11/1999 | Ferguson | |
| 6,018,774 A | 1/2000 | Mayle et al. | |
| 6,049,602 A | 4/2000 | Foladare et al. | |
| 6,061,440 A | 5/2000 | Delaney et al. | |
| 6,061,717 A | 5/2000 | Carleton et al. | |
| 6,072,463 A | 6/2000 | Glaser | |
| 6,151,621 A | 11/2000 | Colyer et al. | |
| 6,157,401 A | 12/2000 | Wiryaman | |
| 6,192,394 B1 | 2/2001 | Gutfreund et al. | |
| 6,237,025 B1 | 5/2001 | Ludwig et al. | |
| 6,240,444 B1 | 5/2001 | Fin et al. | |
| 6,263,365 B1 | 7/2001 | Scherpbier | |
| 6,295,551 B1 | 9/2001 | Roberts et al. | |
| 6,310,941 B1 | 10/2001 | Crutcher et al. | |
| 6,335,927 B1 | 1/2002 | Elliott et al. | |
| 6,343,313 B1 | 1/2002 | Salesky et al. | |
| 6,411,988 B1 | 6/2002 | Tafoya et al. | |
| 6,542,936 B1 | 4/2003 | Mayle et al. | |
| 6,598,074 B1 | 7/2003 | Moller et al. | |
| 6,668,273 B1 * | 12/2003 | Rust ........................... 709/204 | |
| 6,728,784 B1 | 4/2004 | Mattaway | |
| 6,785,244 B2 | 8/2004 | Roy | |

FOREIGN PATENT DOCUMENTS

| | | |
|---|---|---|
| EP | 0622931 A2 | 11/1994 |
| EP | 0779732 A2 | 6/1997 |
| EP | 0874323 A1 | 10/1998 |
| EP | 0908824 A2 | 4/1999 |
| JP | 704987 A | 7/1996 |
| JP | 11249995 A | 9/1999 |
| WO | WO 99/26153 A2 | 5/1999 |
| WO | WO 00/56050 A1 | 9/2000 |
| WO | WO 01/69418 A1 | 9/2001 |

OTHER PUBLICATIONS

Ciancarini, P. et al., "PageSpace: An architecture to coordinate distributed applications on the web," Computer Networks and ISDN Systems, vol. 28, No. 11, May 1996, pp. 941-952, XP004018198.

Hao, M.C. et al., "Collaborative Computing: A Multi-Client Multi-Server Environment," Conference on Organizational Computing Systems, Milpitas, CA, Aug. 12-16, 1995, pp. 206-213, XP000620968.

Holfelder, W., "Interactive Remote Recording and Playback of Multicast Video Conferences," 1998.

Jacobs, S. et al., "Filling HTML Forms Simultaneously: CoWeb-Architecture and Functionality," Computer Networks and ISDN Systems, vol. 28, No. 11, 1996, pp. 1385-1395.

Moralee, D., "Scientific Graphics and Visualization Come to the Internet," Scientific Computing World, Mar. 1, 1995, p. 31, 33/34, 36 XP000571217 (p. 34, '2: The Internet carries videoconferencing MICE across Europe).

Vetter, R.J. et al., "A Multimedia System for Asynchronous Collaboration," Proceedings of the Conference on Emerging Technologies and Applications, vol. 1, 1996, pp. 60-63.

* cited by examiner

SYSTEM AND METHOD FOR APPLICATION VIEWING THROUGH COLLABORATIVE WEB BROWSING SESSION

RELATED APPLICATIONS

This application is a continuation of Application No. 09/442,517, filed Nov. 18, 1999, now U.S. Pat. No. 6,668,273 entitled, "SYSTEM AND METHOD FOR APPLICATION VIEWING THROUGH COLLABORATIVE WEB BROWSING SESSION," issued on Dec. 23, 2003 and U.S. Patent Application Serial No. 10/688,485 entitled "SYSTEM AND METHOD FOR APPLICATION VIEWING THROUGH COLLABORATIVE WEB BROWSING SESSION," filed on Oct. 16, 2003 now U.S. Pat. No. 7,228,332, both of which are incorporated herein by reference in their entirety.

BACKGROUND OF INVENTION

1. Field of the Invention

The present invention relates generally to a system and method for browsing computer networks such as the World Wide Web ("Web"). More specifically, the present invention relates to a system and method for displaying a selected portion of a first computer display on the display of one or more second computers through a collaborative Web browsing session.

2. Related Art

The Internet is comprised of a vast number of world-wide interconnected computers and computer networks. These interconnected computers exchange information using various services such as electronic mail ("email"), Gopher, telnet, file transfer protocol ("FTP"), and the Web. The Web allows a computer that is connected to the Internet to access data that is stored on other interconnected computers. The data available on these interconnected computers is divided up into segments that are colloquially referred to as "Web pages." The data collected together on a Web page is not restricted to a textual format. The data can be graphical, audio, moving picture, or any other compatible multi-media source. Users gain access to Web pages by using an application program known as a "browser." Thus, an individual using a computer connected to the Internet can browse through various Web pages existing on computers around the world.

The ubiquitous nature of the Internet facilitates its use as a business tool. Accordingly, many Web pages are devoted to providing product marketing information and taking sales orders. Additionally, the Web can be used as a communication tool between a sales representative and a potential customer. For example, a collaborative Web browsing system can be used to allow a sales person to guide a potential customer through a predetermined set of Web pages that comprise a sales presentation. This is accomplished by allowing the sales person to control the potential customer's Web browser. Such a system is disclosed in U.S. Pat. No. 5,944,791 ("the '791 patent"), which is hereby incorporated by reference in its entirety.

The '791 patent provides a collaborative Web browsing system and method for allowing a first computer connected to the Web to cause the browsers of one or more second computers simultaneously connected to the Web to display certain predetermined Web pages or presentation slides as directed by the first computer. The problem is that often it is desirable for the user of the first computer ("Presenter") to be able to present to the one or more second computers ("Attendee") images that are not part of the predetermined presentation.

For example, if the Presenter in a collaborative Web browsing session desired to answer a question from an Attendee by showing the Attendee an on-line manual reference, the Presenter would be unable to do so through the collaborative Web browsing session. In order for the Presenter to incorporate such a reference to an on-line manual into future sessions, the Presenter would have to create a Web page or a presentation slide of the particular on-line manual page and include that page or slide in the predetermined flow of the collaborative Web browsing session.

Another example of this problem arises when the Presenter desires to show the Attendee an application running on the first computer. To make such a presentation, the Presenter would be required to create slides or Web pages from static images of the application window prior to the collaborative Web browsing session. The Attendee would not be able to see the application running in real time. This can lead to interpretations by the Attendee of "smoke and mirror" sales techniques and "mock-up" applications.

Yet another example of this problem is when the Presenter, during a collaborative Web browsing session, visits a Web site containing input fields. Perhaps the Presenter is demonstrating a loan calculator that is available on a particular Web page. As the Presenter enters information into fields of the loan calculator, it would be desirable to allow the Attendee to see the information entered by the Presenter prior to submission of the form. Currently, there is no way for the Attendee to see information entered by the Presenter.

Therefore, the problem in a collaborative Web browsing session is that the Attendee cannot see applications running on the Presenter's computer or experience the application running on the Presenter's computer in real time. Furthermore, the Attendee cannot see the completed input fields of a form prior to its submission by the Presenter. Accordingly, it is an object of the present invention to address these problems inherent in a collaborative Web browsing session.

SUMMARY OF INVENTION

As recognized by the present invention, it is desirable for the Presenter in a collaborative Web browsing session to be able to dynamically integrate the active window or a selected application window from the Presenter's computer into the collaborative Web browsing session. Additionally, it is desirable for the Presenter to be able to transmit the entire display screen from the Presenter's computer into the collaborative Web browsing session. Furthermore, it is desirable for the Presenter to be able to interject a selected portion of the display screen from the Presenter's computer into the collaborative Web browsing session. This would allow the Presenter, for example, to demonstrate a local application, display a certain page of an on-line manual, or show the completed fields of a Web based loan application form. Thus, as recognized by the present invention, it is possible to provide a data structure on a computer readable medium that enables the Presenter in a collaborative Web browsing session to cause a region of the Presenter's computer display to be dynamically integrated into the session.

Accordingly, an advantage of the present invention is that it provides a data structure on a computer readable medium that allows the Presenter of collaborative Web browsing session to integrate the active window from the Presenter's computer display into the current session. It is also an advantage of the present invention to provide a data structure on computer readable medium that allows the Presenter of a collaborative Web browsing session to integrate a specifically selected window from the Presenter's computer display into the current session. Another benefit of the present invention is that it provides a data structure on a computer readable medium that allows the Presenter of collaborative Web browsing session to integrate the entire display from the Presenter's computer display into the current session. Yet another feature of the present invention is that it provides an easy-to-use and cost-effective system and method for a Presenter of collaborative Web browsing session to integrate a selected region of the Presenter's computer display into the current session.

A computer program product includes a program means stored on a computer readable medium that is readable by a digital processing system. As intended by the present invention, the computer program product is realized in a machine component that causes the digital processing system to perform method steps to enable a first computer to direct the browser of one or more second computers. As further intended by the present invention, the computer program product is realized in a machine component that causes a region of a first computer's display to appear on the display of one or more second computers participating in a collaborative Web browsing session. Stated differently, a machine component establishes a computer program product for performing method steps to enable a first computer to cause a second computer to display a selected region from the display of the first computer by transmitting an image of the region from the first computer to the second computer through a control site computer connected to the first and second computers via a computer network and a collaborative Web browsing session.

As disclosed in detail below, the present computer performable instructions include selecting the desired region on the display of a first computer, capturing the intended region from the display of the first computer, transmitting an image of the region to the control site computer, transmitting the image from the control site computer to one or more second computers, and then displaying the image on the display of the one or more second computers. In a preferred embodiment, the image is displayed in a separate window on the display of the one or more second computers. The computer program product is also disclosed in combination with the digital processing apparatus, and in further combination with the computer network.

In another aspect, a computer-implemented method is disclosed for allowing a first computer to cause a region of the display of the first computer participating in a collaborative Web browsing session to appear on the display of one or more second computers participating in the same collaborative Web browsing session. The method includes selecting a region from the display of a first computer. In alternative embodiments, the region selected may be a specific window, the currently active window, a selected region, or the entire display. The method also includes capturing the selected region of the display on the first computer. Additionally, the method includes transmitting an image of the region from the first computer to a control site computer that is connected to the first computer by a computer network and a collaborative Web browsing session. The method also includes transmitting the image from the control site computer to one or more second computers that are similarly connected to the control site computer by a computer network and a collaborative Web browsing session. In a preferred embodiment, the first, second, and control site computers are all connected to each other through the Internet. Finally, the method includes the one or more second computers displaying the image received from the first computer via the control site computer. In alternative embodiments, the image may appear in a separate window on the display of the one or more second computers or the image may appear in the window containing a previously displayed image from the first computer.

In still another aspect, a system is disclosed for allowing a first computer to cause a region of the display of the first computer to appear on the display of one or more second computers by transmitting an image of the desired region to the second computers through a control site computer connected to the first and second computers through a computer network and a collaborative Web browsing session. The system includes, at the first computer, a selector for selecting a region on the display of the first computer. A transmitter for transmitting an image of the region to a control site connected to the first computer by a computer network. At the one or more second computers, also connected to the control site computer by computer network, a requester for requesting new images from the control site computer. At the control site, a second transmitter is provided for transmitting notification of new images to the one or more second computers. The second transmitter additionally transmits images to the one or more second computers. At the one or more second computers, a display is provided for displaying the image received from the control site on the display of the one or more second computers.

BRIEF DESCRIPTION OF DRAWINGS

The details of the present invention, both as to its structure and operation, can best be understood in reference to the accompanying drawings, in which like reference numerals refer to like parts, and in which.

DETAILED DESCRIPTION OF THE PREFERRED EMBODIMENTS OF THE INVENTION

The present invention is directed toward a system and method for browsing computer networks such as the World Wide Web. More specifically, the present invention relates to a system and method for allowing a first computer in a collaborative Web browsing session to project a selected region of its screen onto the display of one or more second computers in the same session. In a preferred embodiment, the screen portion can be the active window, a selected window, the first computer's entire display, or any selected region of the first computer's display.

After reading this description, it will become apparent to one of ordinary skill in the art how to implement the invention in alternative embodiments and alternative applications. As such, this detailed description of preferred and alternative embodiments should not be construed to limit the scope or breadth of the present invention.

Figure 1:
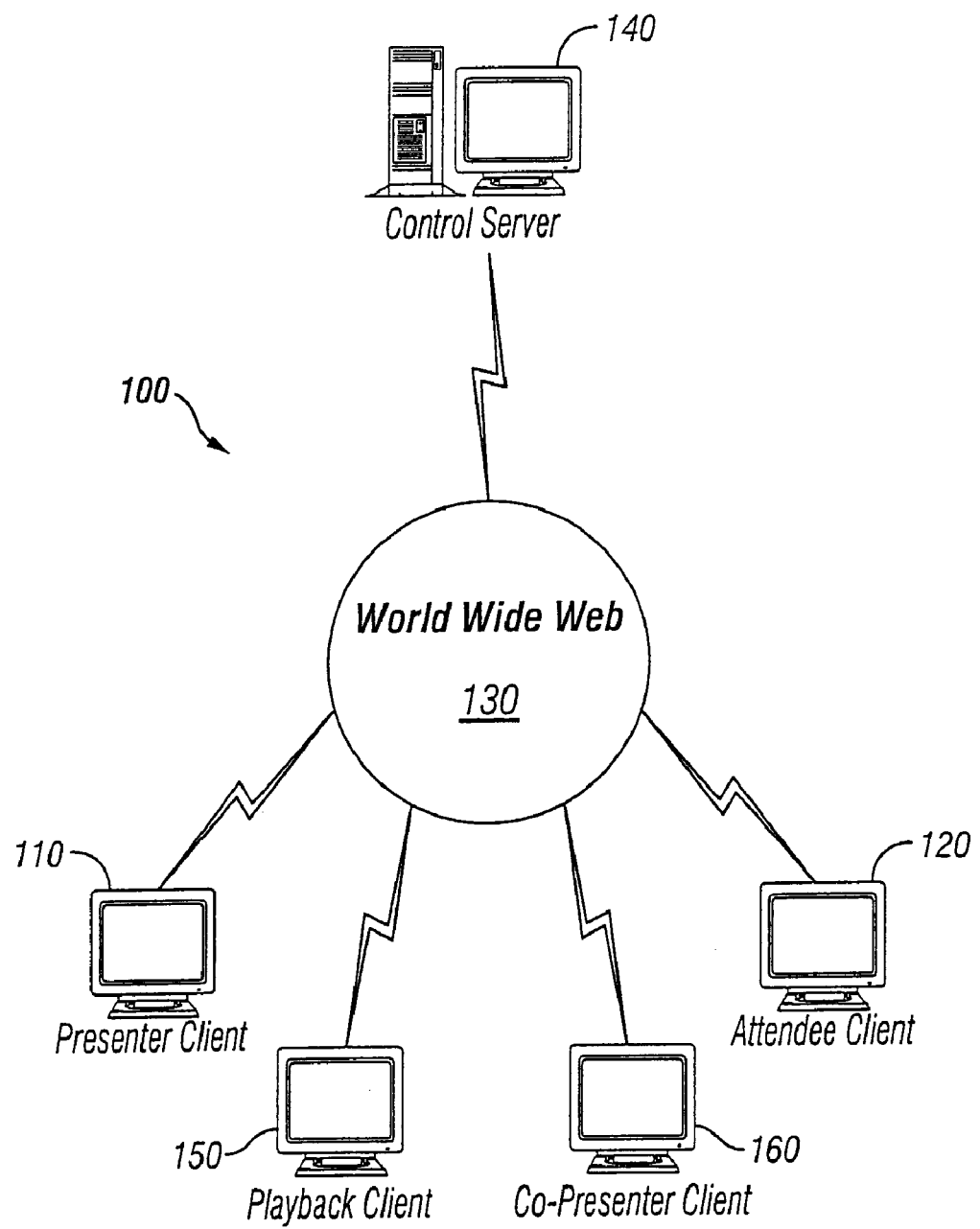
FIG. 1 is a functional diagram depicting an operational environment according to one embodiment of the present invention.
Figure 1A:
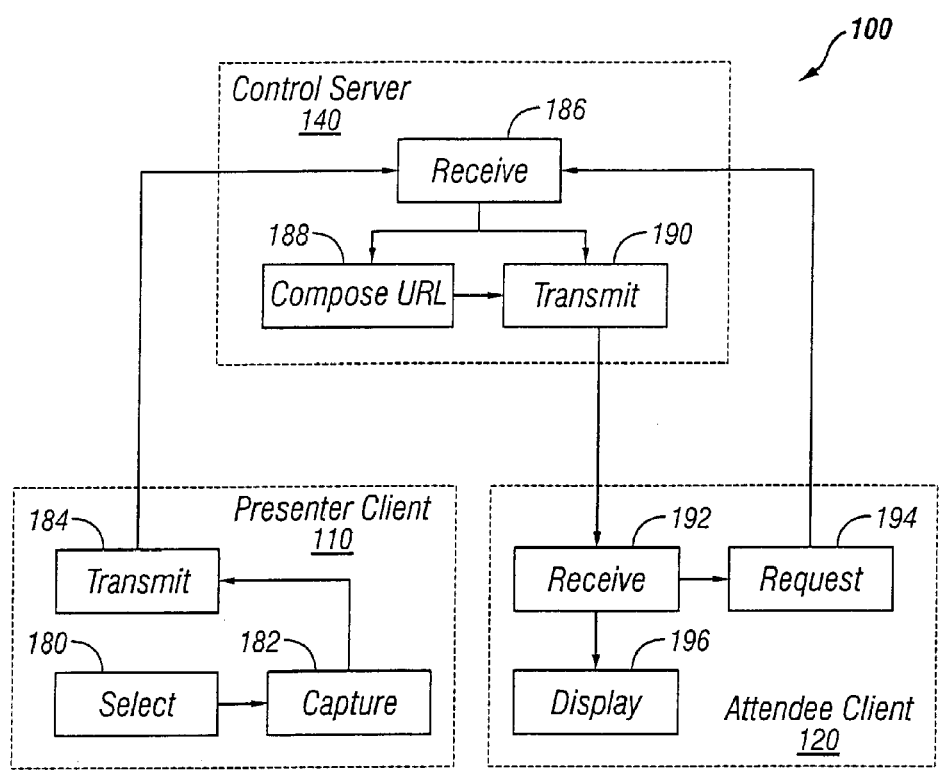
FIG. 1A is a block diagram depicting an operational environment according to one example of the present invention.
Figure 3:
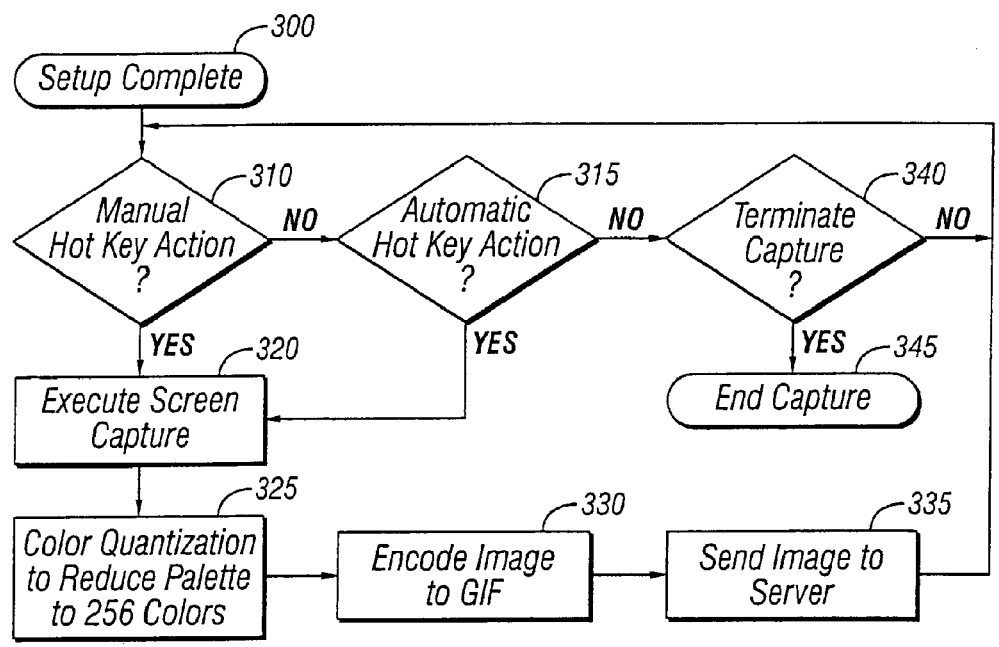
FIG. 3 is a flowchart depicting an example of a method that can be used by the Presenter to capture the target display area during the collaborative Web browsing session and send it to the Control Server.
Figure 4:
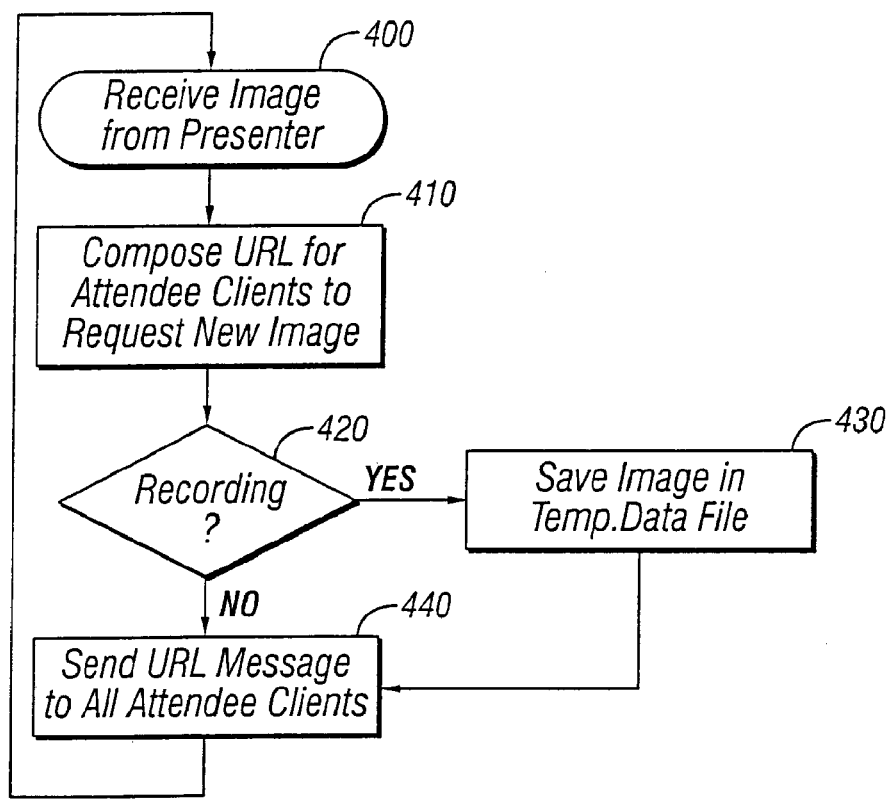
FIG. 4 is a flowchart depicting an example of a method that can be used by the Control Server to notify the Attendee Clients of the new image being integrated into the collaborative Web browsing session.
Figure 5:
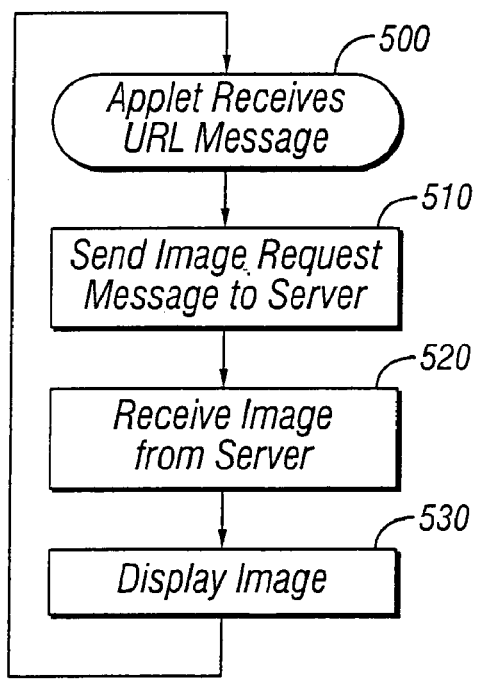
FIG. 5 is a flowchart depicting an example of a method that can be used by the Attendee Client to display the new image being integrated into the collaborative Web browsing session.

FIGS. 1 and 1A are diagrams that show example collaborative Web browsing sessions. FIGS. 2, 3, 6, 7, and 8 are flowcharts and sample screens that illustrate, as embodied in the present invention, the configuration of the Presenter Client 110 computer and the capture of the selected image on the Presenter Client 110 computer. Additionally, FIGS. 4 and 5 represent the flow of data to and from the Control Server 140 through a computer network and the presentation of the image on the display of the Attendee Client 120 as embodied in the present invention. Those skilled in the art will appreciate that the Figures illustrate the structures of logic elements such as computer program code elements or logic circuits that function according to this invention. Manifestly, the invention is practiced in its essential embodiment by a machine component that renders the logic elements in a form that instructs a digital processing apparatus (a computer) to perform a sequence of function steps corresponding to those shown in the figures.

These instructions may reside on a program storage device including a data storage medium, such as a computer diskette, optical disk, compact disk ("CD"), or magnetic tape. Alternatively, such media can also be found in semiconductor devices, on a conventional hard disk drive, electronic read-only memory, electronic access memory, or on any other appropriate data storage device. In an illustrative embodiment of the invention, the logic means are computer executable instructions that are written in the Java programming language.

Referring initially to FIG. 1, a functional overview of the present invention is shown. A collaborative Web browsing session 100 is initiated between the Presenter Client 110 and the Attendee Client 120. In a preferred embodiment, this session is established over the Internet using the Web 130. The Presenter Client 110 computer and the Attendee Client 120 computer can be any suitable computer such as a personal computer ("PC") or a laptop computer, each having a display, such as a video monitor or flat panel display for presentation. Also, the Web browsers used in the collaborative Web browsing session by the Presenter Client 110 and the Attendee Client 120 may advantageously be commercial browsers such as those made by Netscape and Microsoft. Furthermore, it should be noted that the World Wide Web is just one example of a computer network that can be used with the present invention. In alternative embodiments, other types of computer networks can be used, including LANs, WANs, intranets, etc. Accordingly, the use of the Web 130 as an exemplary computer network used in the explanatory examples should not be construed to limit the scope or breadth of the present invention.

Referring back to FIG. 1, the collaborative Web browsing session 100 in this example embodiment is facilitated by the use of a Control Server 140, which includes a control module that enables the Presenter Client 110 to control the Web browser of one or more Attendee Clients 120. Accordingly, the Presenter Client 110 has an active control associated with its Web browser. This active control is preferably a small application program referred to as an "applet." The applet running on the Presenter Client 110 allows the Presenter Client's 110 Web browser to communicate with the control module on the Control Server 140. This communication preferably takes place via a computer network, such as the Web 130. Similarly, the one or more Attendee Clients 120 (only a single Attendee Client is shown in FIG. 1 for clarity) include an applet that allows the Attendee Client's Web browser to communicate with the control module on the Control Server 140. Preferably, the communication between the Presenter Client 110, the Control Server 140, and to the Attendee Client 120 takes place through a computer network, such as the Web 130. Thus, FIG. 1 depicts a collaborative Web browsing session in which the Presenter Client 110 and the Attendee Client 120 use an applet to communicate with the Control Server 140 over a network such as the Web 130.

FIG. 1A depicts an example of a block diagram of a collaborative Web browsing session 100. In a preferred embodiment, Presenter Client 110 has a Selector 180 by which the Presenter Client 110 may choose the desired region of the screen to integrate into the collaborative Web browsing session 100. Additionally, the Presenter Client 110 has a Capturer 182 and a Transmitter 184 that allow the Presenter Client 110 to capture an image associated with the selected region and send it to the Control Server 140. For example, the Presenter Client 110 may use the Selector 180 to select the active window on the Presenter Client's 110 computer. Subsequently, the Presenter Client 110 may use the Capturer 182 to capture the selected active window. Then, the Presenter Client 110 may use the Transmitter 184 to send an image associated with the active window to the Control Server 140.

In one example embodiment, the Control Server 140 has a Receiver 186 to receive images sent from the Presenter Client 110. Furthermore, the Control Server 140 has, in the sample embodiment, a URL Composer 188 and a Transmitter 190. The Control Server 140 may, for example, use the URL Composer 188 to compose a URL that allows the Attendee Client 120 to request the dynamically integrated image from the Presenter Client 110. Moreover, in this example, the Control Server 140 uses the Transmitter 190 to send the URL to the Attendee Client 120.

In a preferred embodiment, the Attendee Client 120 has a corresponding Receiver 192 to receive the URL from the Control Server 140. Upon receipt, the Attendee Client 120, for example, uses its Requestor 194 to send the URL as a request to the Control Server 140. The Receiver 186 of the Control Server 140 preferably receives the request. Upon receipt, the Control Server 140 sends the requested image to the Attendee Client 120 using the Transmitter 190. The Attendee Client 120 preferably receives the image from the Control Server 140 with the Receiver 192 and subsequently, in one example embodiment, displays the image using its Displayer 196. In another example embodiment, the Control Server 140 receives the image from the Presenter Client 110 and directly transmits that image to the Attendee Client 120 for display by its Displayer 196.

In one example embodiment, the Presenter Client 110 establishes a collaborative Web browsing session 100. To initialize a session, the Presenter Client 110 transmits a user name and password to the Control Server 140. The Control Server 140 then determines whether the Presenter Client's 110 user name and password are valid. If invalid, the Control Server 140 causes a message to be displayed to the Presenter Client 110, indicating that the Presenter Client 110 lacks the necessary authority to create a session. Alternatively, if the user name and password are valid, the Control Server 140 sends the Presenter Client 110 an identification code corresponding to the session. Once the Control Server 140 has validated the Presenter Client 110 and sent the identification code, a collaborative Web browsing session 100 has been created.

Continuing the example, the Attendee Client 120 can join the collaborative Web browsing session 100 at any time after the session has been created. To join the session, the Attendee Client 120 preferably sends to the Control Server 140 the identification code corresponding to the desired session. Once the Control Server 140 authenticates the identification code, it causes the previously discussed applet to be downloaded to the Attendee Client 120. Once the applet has been downloaded to the Attendee Client 120, the Attendee Client 120 relinquishes control of its Web browser to the Presenter Client 110.

The flow of the collaborative Web browsing session 100 can take place sequentially or in parallel. For example, there may be more than one Presenter Client 110 participating in a collaborative Web browsing session 100. These additional Co-Presenter Clients 160 are secondary to the Presenter Clients 110. However, for clarity and ease of understanding, most of the collaborative Web browsing sessions 100 described in this specification include a single Presenter Client 110. Examples with more than one Presenter Client 110 are described to particularly point out aspects of the present invention that are related to the primary Presenter Client 110 or the secondary Co-Presenter Clients 160.

Accordingly, the flow of a collaborative Web browsing session 100 begins with the Presenter Client 110 sending a request to the Control Server 140. This request may be to send new visual data to the Attendee Clients 120. Alternatively, the request could be to exercise any of the various features in the collaborative Web browsing session. Such features include, but are not limited to, browsing to a new Web page, displaying a new presentation slide, diagramming on a virtual whiteboard, and conversing in a chat window.

In a preferred embodiment, if the action by the Presenter Client 110 requests new visual data in the form of a new presentation slide, the Control Server 140 causes the Attendee Client 120 browsers to download the requested slide. For example, prior to the collaborative Web browsing session 100, the Presenter may convert a PowerPoint™ slide show into graphical images that are compatible with standard commercial Web browsers. Thus, when the Presenter Client's 110 request is for a new slide, the Control Server 140 causes the Attendee Client's 110 web browser to display the slide.

On the other hand, if the request is for a new Web page, the Control Server 140 retrieves the requested page from the Web 130 and filters it for the Presenter Client 110 and the Attendee Client 120. In a preferred embodiment, the first filtering process carried out by the Control, Server 140 is for the Presenter Client 110 and causes all of the hyperlinks of the requested Web page to point back to the Control Server 140. After the requested Web page has been filtered for the Presenter Client 110, the Control Server 140 causes the requested page to be downloaded to the Presenter Client 110. The second filtering process carried out by the Control Server 140 in this example embodiment is for the Attendee Client 120. This process causes all of the hyperlinks of the requested page to be disabled. After the requested Web page has been filtered for the Attendee Client 120, the Control Server 140 causes the requested page to be downloaded to the Attendee Client 120. Thus, the collaborative Web browsing session 100 may flow through a series of Web pages and previously prepared slides that collectively comprise the session.

During this flow of the collaborative Web browsing session 100, the Presenter Client 110 may desire to deviate from the predetermined course of Web pages and slides. The Presenter Client 110 may desire to integrate some portion of its own display into the flow of the collaborative Web browsing session 100. For example, the Presenter Client 110 may desire that the Attendee Client 120 view an application window that is running locally at the Presenter Client's 110 computer. Therefore, in this example, rather than directing the Control Server 140 to cause the next slide or the next Web page to be displayed on the Attendee Client's 120 computer, the Presenter Client 110 directs the Control Server 140 to cause an application window from the Presenter Client's 110 computer to be displayed on the Attendee Client's 120 computer.

To effectuate the dynamic inclusion of a region from the Presenter Client's 110 display into the collaborative Web browsing session 100, the region is selected, captured, sent to the Control Server 140, and sent to the Attendee Client 120 where it is finally displayed.

Figure 2:
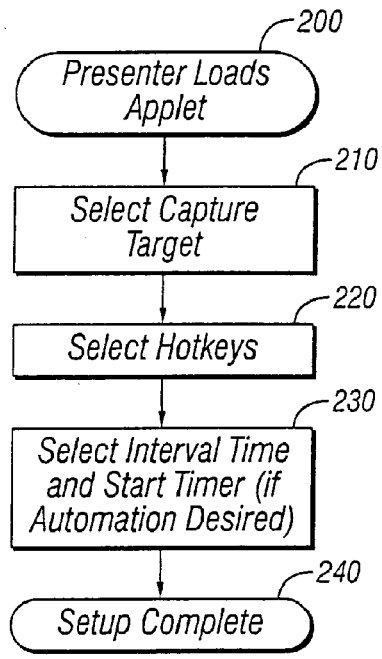
FIG. 2 is a flowchart depicting an example of a method that can be used as a configuration process by the Presenter to configure the applet for transmitting the target display area into the collaborative Web browsing session.

FIG. 2 is a flowchart that depicts an example configuration process that can be used on the Presenter Client 110 computer. Initially, the Presenter Client 110 loads an applet as illustrated in step 200. When selecting the capture target in a preferred embodiment as shown in step 210, the Presenter Client 110 may choose the entire desktop, a certain region of the display, a selected window, or the active window. In an example embodiment the Presenter Client 110 may select the desired region by clicking on a radio button in the control window. An example of a control window that can be used by the Presenter Client 110 to select the capture target is subsequently described in FIG. 6.

Furthermore, as portrayed by step 220, the Presenter Client 110 may select which keys will function as the hotkeys. In an alternative embodiment, separate hotkeys are available for a capture command, for a repeat capture command, and to toggle on and off the auto-refresh feature. An example of a control screen that can be used by the Presenter Client 110 to configure the hotkeys is subsequently described in FIG. 7.

In one embodiment, represented in step 230, the Presenter Client 110 selects the time interval for the automatic refresh feature. In alternative embodiments, the Presenter Client 110 may select 3 seconds as the interval or 3 minutes as the interval. For example, if an application on the Presenter Client's 110 computer was frequently changing its display screen, then the time interval would preferably be shorter. An example of a control screen that the Presenter Client 110 can use to select the time interval for the automatic refresh feature is subsequently described in FIG. 8. When the capture target, hotkeys, and time interval have been selected the setup process is complete, as illustrated in step 240.

Those skilled in the art will recognize that the active window in a windowing system is the window that has the central focus of the system. Thus, in this same example, when the Presenter Client 110 has selected the active window as the target, the desired window must become the central the focus of the windowing system. The focus may be shifted to the desired window, for example, by clicking the mouse in the desired window such that the focus of the windowing system is centered on the appropriate window. The application window may also become the focal point by pressing a certain combination of keys on the keyboard until the desired window is in focus. For example, using a windows based operating system, the Presenter Client 110 may cycle the focus of the windowing system through the available windows by pressing the [ALT]-[TAB] key combination. When the desired application window comes into focus, the selection is complete.

Additionally in the selection process, the region of the screen chosen as the target by the Presenter Client 110 may be the active window, a specifically selected window, the entire computer display, or a selected portion of the computer display. In the above example, the region selected as the target was the active window. In another example, the region could be the entire computer display, colloquially referred to as the "desktop." In a preferred embodiment, the Presenter Client 110 may enter a presentation control window to select the desktop as the target region. An example of a control window that can be used by the Presenter Client 110 to select the capture target is subsequently described in FIG. 6. Alternatively, the Presenter Client 110 may select a region of the display or a specific window to integrate into the session.

After a portion of the screen has been selected as the desired region, the region is preferably captured by the Presenter Client's 110 applet. For example the Presenter Client 110 may first select the desired region in a control window, as described above in step 210. In an example embodiment, after the target has been selected the Presenter Client 110 captures the target by pressing a previously determined combination of keys on the keyboard, referred to as a "hotkey." For example, in one example embodiment, the Presenter Client 110 selects the [PRINTSCREEN] key to be the hotkey for the capture command as described above in step 220. In such a case, when the Presenter Client 110 pressed the [PRINTSCREEN] key, the selected target would be captured by the applet.

In an alternative embodiment, the applet causes an ActiveX Control or Plug-In to execute the capture on its behalf. Another example of how the selected target may be captured is by clicking a predetermined button on the mouse. In a preferred embodiment, the capture command may be performed by simultaneously clicking the right and left mouse buttons after the desired region has been selected.

When the hotkey is executed, the previously selected screen area is captured by the applet on the Presenter Client 110 and incorporated into the flow of the collaborative Web browsing session 100. In a preferred embodiment, the selected and captured region of the screen is sent to the Control Server 140 as graphical data. For example, the Control Server 140 receives the graphical image from the Presenter Client 110, processes the image as part of the current collaborative Web browsing session, and then causes the image to be sent to the Attendee Clients 120. In the same example, each Attendee Client 120 receives the image from the Control Server 140 and then subsequently displays that image. In a preferred embodiment, the applet on the Attendee Client 120 causes the image to be displayed in a newly opened browser window. Alternatively, the applet may cause the image to be displayed in a new applet window. Continuing with the same example, the image on the display of the Attendee Client 120 is refreshed using the same process each time the hotkey is activated by the Presenter Client 110.

Yet another example of how the selected target may be captured is by instructing the Presenter Client 110 applet to automatically execute the capture. For example, the Presenter Client 110 may enter a control window and configure the applet to automatically capture the targeted region, as described above in step 230. In a preferred embodiment, the applet may be instructed to capture the targeted region by clicking with the mouse a button labeled "Start auto-refresh" that appears in a control window. An example of a control window that can be used by the Presenter Client 110 to start the automatic refresh is subsequently described with reference to FIG. 8.

In the same embodiment, once the applet has been directed to initiate the capture, the applet can be further configured to automatically refresh, or re-execute the capture. Thus, in a preferred embodiment, the Presenter Client 110 applet may repeatedly capture the selected target in incremental time periods. For instance, in an example embodiment, the Presenter Client 110 applet may be instructed to perform the capture every 3 seconds. In such an embodiment, the automatic capture would allow the Presenter Client 110 to continuously update of the selected region on the Attendee Client's 120 display without manual intervention.

After the target has been selected and captured, the Presenter Client 110 applet sends the image to the Control Server 140 for integration into the collaborative Web browsing session 100. FIG. 3 is an example of a process by which the Presenter Client 110 captures the selected image and sends the image to the Control Server 140. In an example embodiment, the Presenter Client 110 applet waits for the hotkey instructing it to capture the selected target, as illustrated by steps 310 and 315. In a preferred embodiment, the hotkey capture command can be either manual or automatic.

In an illustrative embodiment, after the screen capture has been executed by the Presenter Client 110 applet in step 320, the applet performs a color quantization step to reduce the color palette of the captured image to 256 colors, as indicated by step 325. In step 330, the Presenter Client 110 applet encodes the captured and quantized image into a graphics file format. For example, the applet 5 encodes the image into the GIF format. After encoding, the Presenter Client 110 applet sends the image to the Control Server 140, as shown in step 335. Preferably, after the image has been captured and sent to the Control Server 140, the Presenter Client 110 continues to wait for more screen capture commands. In a preferred embodiment, as illustrated by step 340, if the Presenter Client 110 applet receives a terminate command, the application viewing process ends as shown in step 345. In an example embodiment, the termination could be initiated by termination of the entire collaborative Web browsing session 100 or alternatively the termination could be initiated by a terminate capture command sent by the Presenter Client 110.

FIG. 4 discloses an example of a process that can be used on the Control Server 140 after the captured image is received from the Presenter Client 110. For example, after an image is received from the Presenter Client 110, as shown in step 400, the Control Server 140 composes a URL associated with the received image as illustrated in step 410. This URL is preferably sent to each Attendee Client 120, as shown in step 440, and subsequently used by each Attendee Client 120 to request the new image as described below with reference to FIG. 5. This process is repeated for each image captured and sent to the Control Server 140 by the Presenter Client 110 or the Co-Presenter Client 160.

Once an image has been sent from the Control Server 140 to the Attendee Clients 120, the Attendee Client preferably displays the image. FIG. 5 is an example of a process that can be used to display the captured image on the computer screen of an Attendee Client 120. First, as illustrated in step 500, the Attendee Client 120 receives a new image URL from the Control Server 140. In a preferred embodiment, as shown in step 510, each Attendee Client 120 immediately sends a corresponding image request to the Control Server 140. As demonstrated in step 520, after sending the image request to the Control Server 140, the Attendee Client 120 receives the image from the Control Server 140. Once the image has been received from the Control Server 140, the Attendee Client 120 displays that image. In a preferred embodiment, as shown in step 530, the image from the Control Server 140 is displayed in a separate window.

In an alternative embodiment, the separate window displaying the captured image is refreshed each time a capture command is executed by the Presenter Client 110 or by a Co-Presenter Client 160. In an alternative embodiment, the Presenter Client 110 and each Co-Presenter Client 160 will have a unique separate window on the desktop of the Attendee Client 120. In such an embodiment, additional screen captures or refreshes by the Presenter Client 110 and the Co-Presenter Client 160 are sent to the corresponding unique separate windows on the Attendee Client 120 display.

Figure 6:
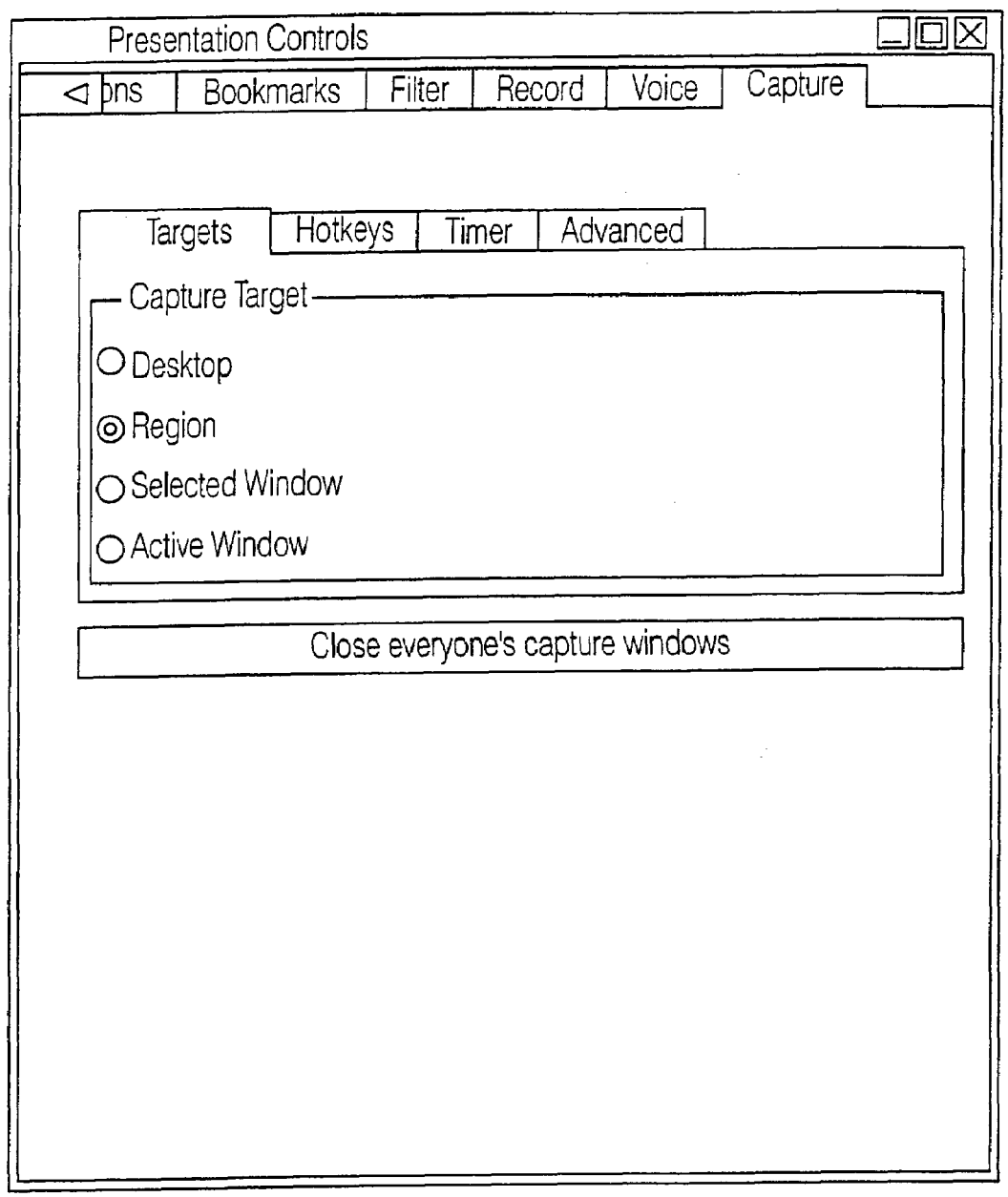
FIG. 6 is an example of a configuration window allowing the Presenter to select the target region to be displayed on one or more second computers.

FIG. 6 depicts an example of a control window that allows the Presenter Client 110 to select the region to be integrated into the collaborative Web browsing session 100. For example, the Presenter Client 110 can click the mouse on a radio button for the desktop, a specific region, a selected window, or the active window to target that region for inclusion in the collaborative Web browsing session 100, as discussed above with reference to step 210.

Figure 7:
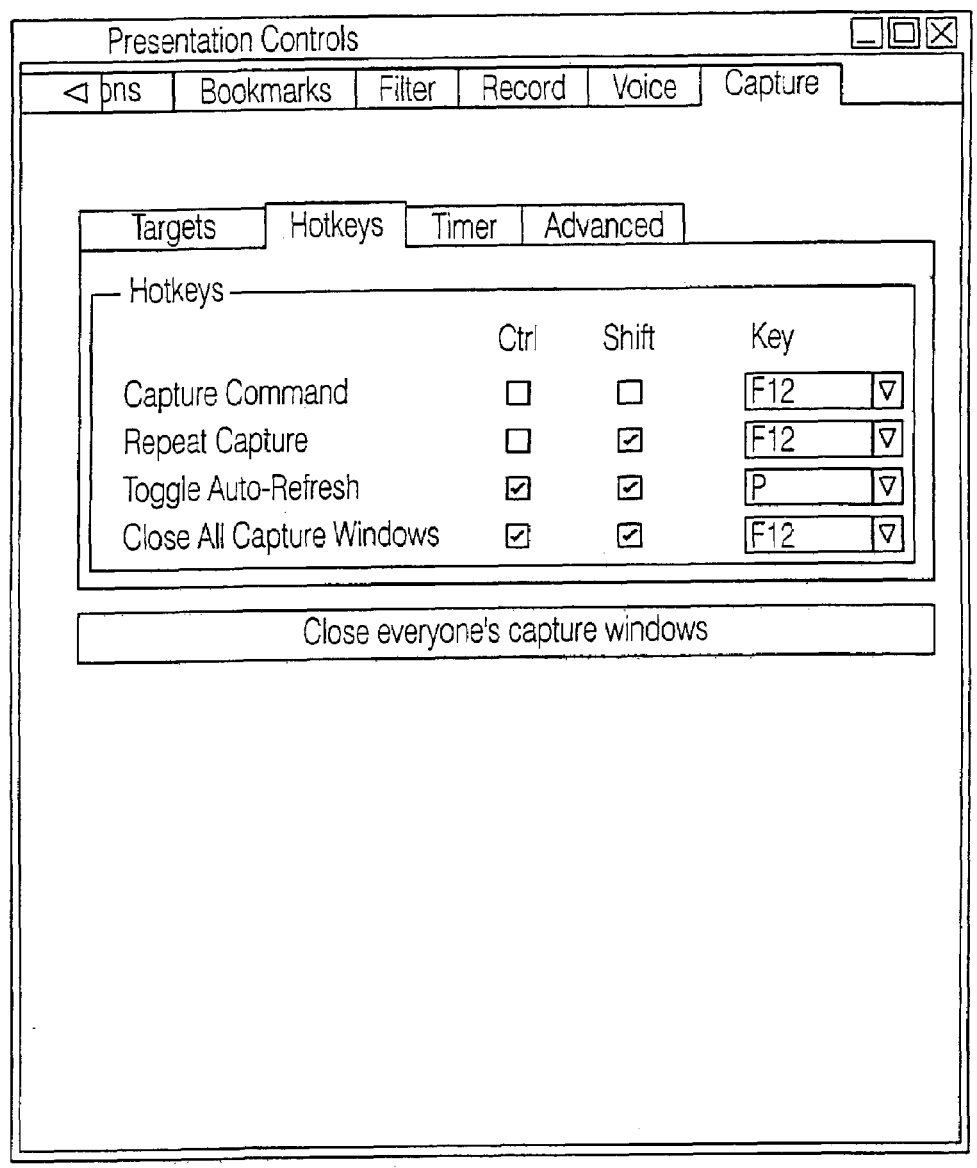
FIG. 7 is an example of a configuration window allowing the Presenter to select the keyboard combinations that cause the capture, repeat capture, and turning on and off of the automatic refresh feature.

FIG. 7 depicts an example of a control window that allows the Presenter Client 110 to select the keyboard combinations that will serve as the hotkeys as discussed above with reference to step 220. For example, the Presenter Client 110 may choose to have the [PRINTSCREEN] key serve as the initial capture command. Additionally, in one example embodiment, the Presenter Client 110 may select hotkeys to repeat the capture command and also to turn on and off the automatic refresh feature.

Figure 8:
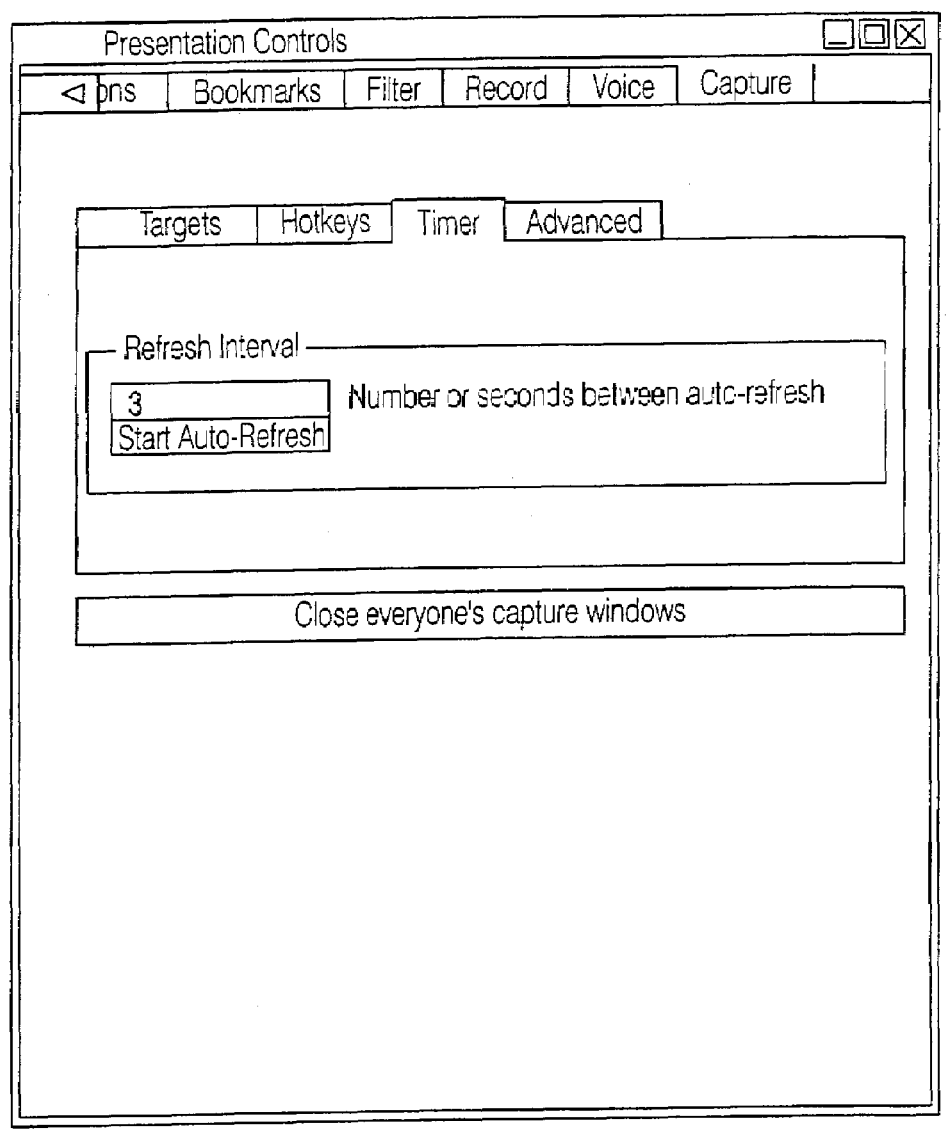
FIG. 8 is an example of a configuration window allowing the Presenter to set the interval of time between automatic captures of the selected region.
Figure 9:
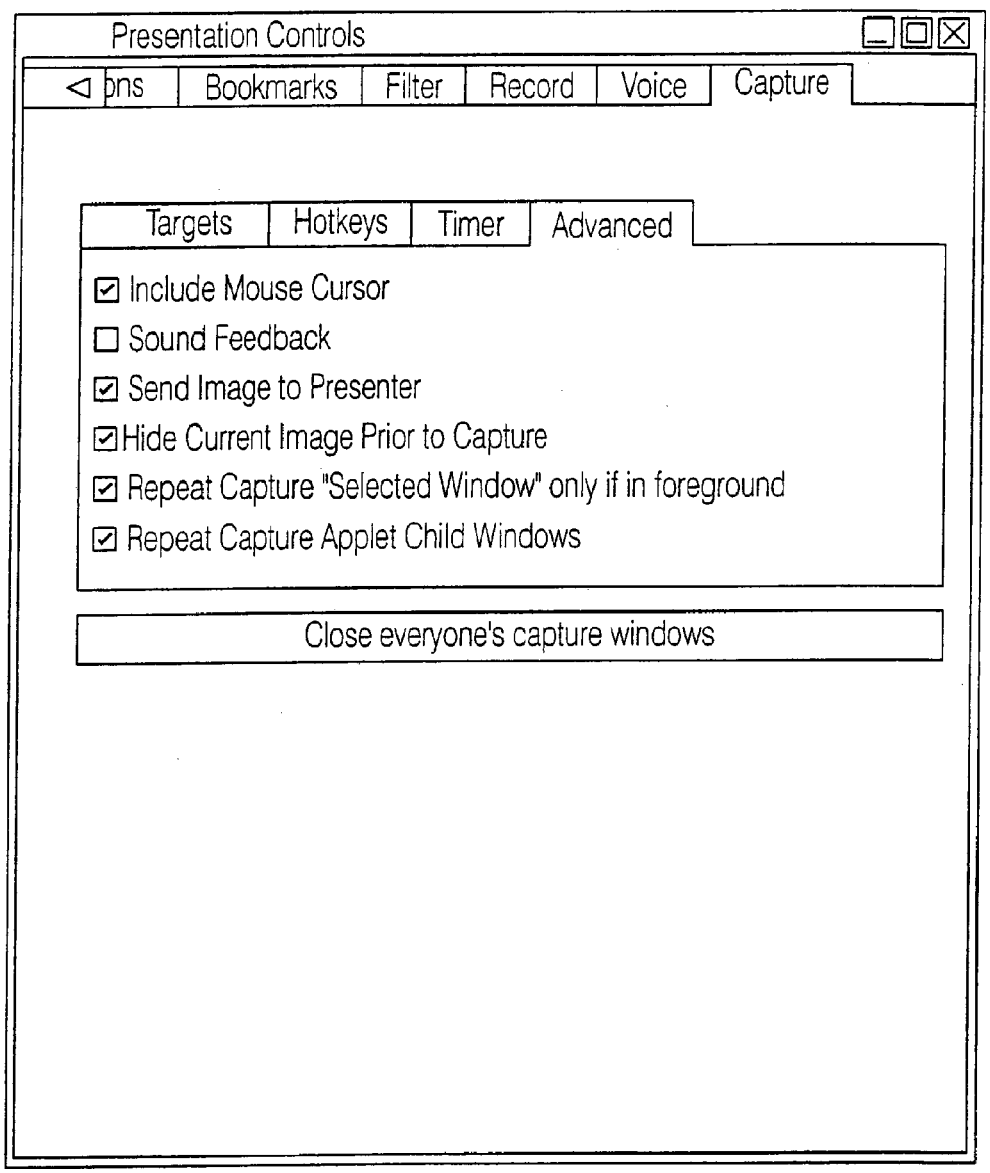
FIG. 9 is an example of a configuration window allowing selection of Advanced options.

FIG. 8 depicts an example of a control window that allows the Presenter Client 110 to set the interval period for the automatic refresh feature, as discussed above with reference to step 230. In one example embodiment, the Presenter Client can set the refresh interval to 3 seconds. In a preferred embodiment, the refresh timer is set to a higher value for regions that infrequently change.

While the particular application viewer of a collaborative Web browsing session herein shown and described in detail is fully capable of attaining the above described objects of this invention, it is to be understood that the description and drawings represent a presently preferred embodiment of the invention and are, as such, representatives of the subject matter which is broadly contemplated by the present invention. It is further understood that the scope of the present invention fully encompasses other embodiments that may become obvious to those skilled in the art, and that the scope of the present invention is accordingly limited by nothing other than the appended claims.

What is claimed is:

1. A computer system including a first computer with a first display, a control site computer, and a second computer, wherein said first, control site, and second computers are coupled together through a computer network, said computer system comprising:
   a selector for selecting a region on the first display;
   a first transmitter coupled to the first computer for transmitting an image associated with said region to the control site computer;
   a second transmitter coupled to the control site computer for transmitting said image to the second computer; and
   a display coupled to the second computer for displaying the image on the second computer;
   the first computer for selecting a hotkey that when executed, captures a previously selected region on the first display and incorporates the captured previously selected region into the image.

* * * * *